Aug. 27, 1929.  R. F. LAUGHLIN  1,726,032
BEAN SNIPPER
Filed May 10, 1928  2 Sheets-Sheet 1
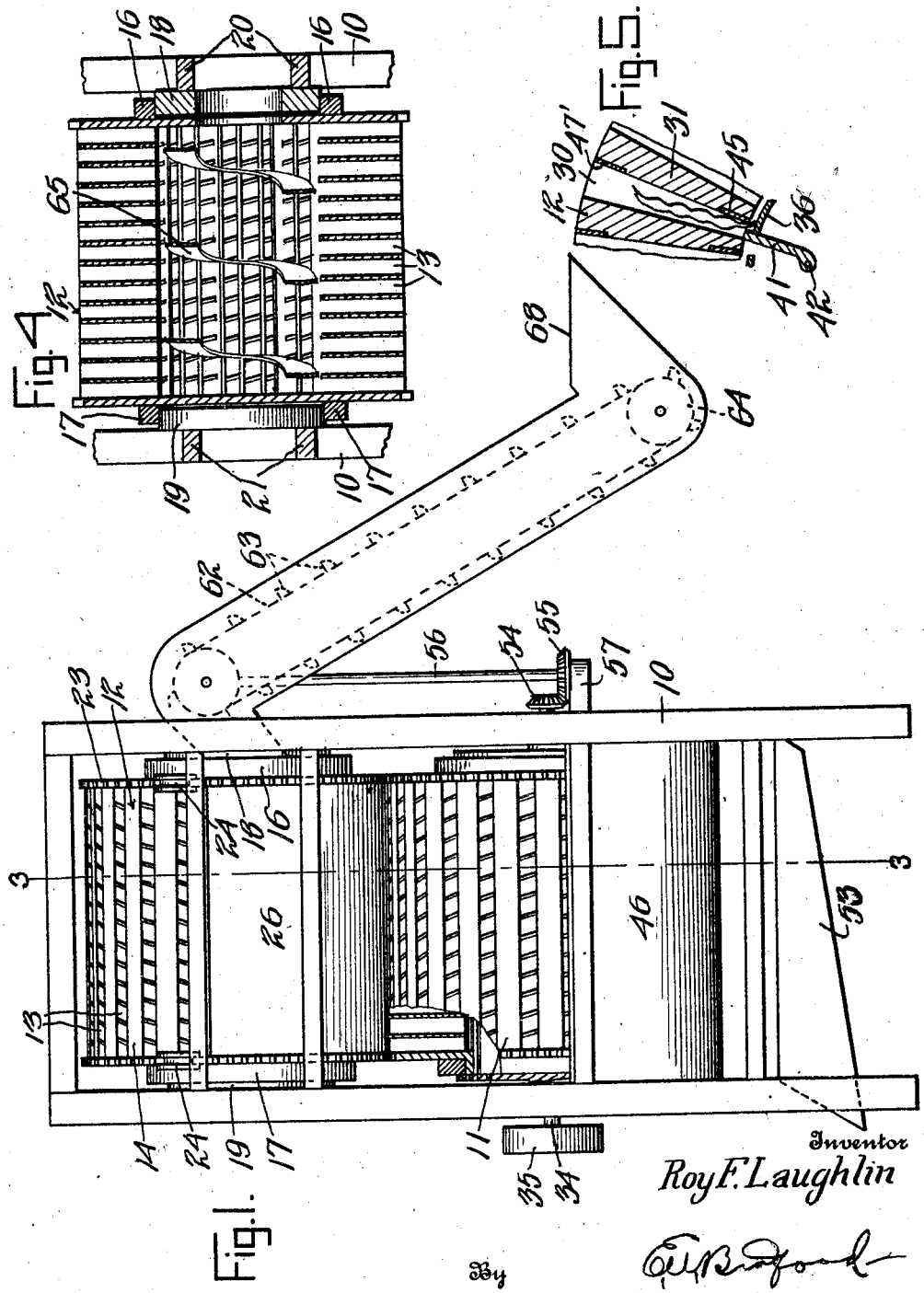
Inventor
Roy F. Laughlin

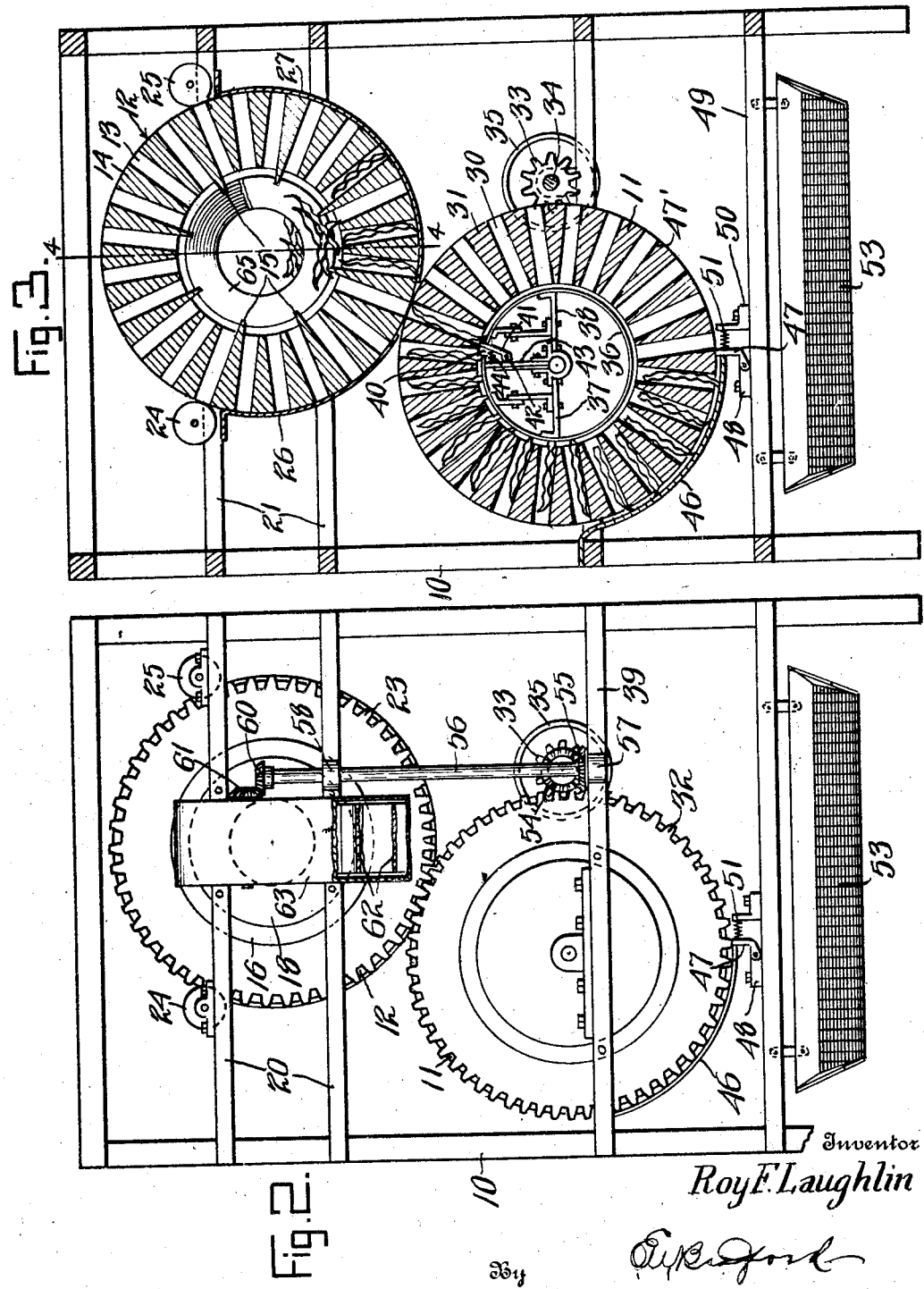

Patented Aug. 27, 1929.

1,726,032

UNITED STATES PATENT OFFICE.

ROY F. LAUGHLIN, OF ELWOOD, INDIANA.

BEAN SNIPPER.

Application filed May 10, 1928. Serial No. 276,785.

My invention relates to improvements in bean snipping machines, which are designed particularly for operating upon string beans.

It is an object of the invention to provide a machine for the purpose stated which will operate to effectively snip the ends of the beans to prepare them for canning operations or for domestic use where food is prepared on a large scale, such as in hotels, restaurants, etc. A further object of the machine is to provide a means for feeding the beans regularly and uniformly to the machine, and to provide overflow means for such beans as are not carried through the snipping mechanism.

A further object of the invention is to provide a machine of the character stated, which will effectively perform the objects of the invention, but in which the operating parts are reduced to a minimum.

Further objects and advantages of the invention will become apparent as the nature of the device is further revealed in the specification which follows.

Referring to the accompanying drawings which are made a part hereof, and on which similar reference characters indicate similar parts, Figure 1, is a front elevation of the device, Figure 2, an end elevation with the conveyor removed, Figure 3, a vertical section on line 3—3, Figure 1, Figure 4, is a vertical section view on line 4—4 Figure 3, and Figure 5, is an enlarged detail showing the snipper blade.

In the drawings numeral 10 indicates the frame work on which the drums 11 and 12 are rotatably mounted. The structure of the drums 11 and 12 is as follows:

The upper drum 12, into which the beans are first fed, is provided with a number of radial slots 13, positioned with intermediate walls 14 therebetween. Some of the walls 14 have their inner ends extending in, as shown at 15, to provide a somewhat rough, or uneven surface around the interior of the drum, in order to shake the beans around in a way so as to assist their lodging endwise in the slots 13. This drum has circular end bearings 16 and 17, into which fit corresponding bearing-heads 18 and 19, positioned on the cross bars 20 and 21, on the frame of the machine. Within the drum 12 is positioned the conveying device in the nature of a screw 65 which is attached to the inner periphery of the drum. This screw has its fins sloping in the direction of travel of the beans, so as to deliver them from the inlet through the hollow of the drum and to cause them to drop into the slots 13 as they are carried through the drum. Such of the beans as are not caused to drop into the slots will be carried to the outer open end of the drum and delivered to a suitable receptacle (not shown) provided for receiving the overflow supply. The drum is provided on its end with gearing 23 by means of which it is driven. Rollers 24 and 25 in engagement with the periphery of the drum hold it against radial displacement. Positioned beneath this drum are members 26 and 27 which fit in loose engagement with the periphery of the drum and hold the beans from dropping through the slots, and also assist in holding the drum in proper position.

The drum 11 is mounted on bearings similar to those described with respect to the drum 12. This drum is positioned beneath the drum 12 and somewhat to one side, so that the peripheral engagement of the two drums is not immediately above the axis of the lower drum. The lower drum is somewhat similar to the upper one just described, in that it has radial holes or passages 30 having walls 31 therebetween. The inner edges of the walls 31 in this drum cooperate to form a rather smooth interior, and in this respect is unlike the drum 12 which has the projections 15 on its interior. This drum is provided with a gear wheel 32 which is driven by a pinion 33 on a shaft 34. The shaft 34 is driven by a pulley 35 from any suitable source of power. The drum 11 has positioned within it cutting mechanism for snipping off one end of the beans. This cutting mechanism is as follows: A retainer plate 36 is mounted upon members 37 and 38, and these are mounted upon the cross bar 39 on the frame of the machine. The retainer plate 36 has an opening at 40 through which a cutter blade 41 extends. This cutter blade 41 is pivotally attached at 42 to a bar bracket 43. A compression spring 44 between the cutter knife and the supporting bar tends to urge the cutter bar clockwise, as shown in Figure 3. The cutter bar has a sharp upper knife edge which maintains close cutting engagement with the inner cylindrical wall of the drum. The edges of walls 31 in the drum are preferably provided with a hard knife edge 45, against which the cutter engages in order to insure a smooth, keen cut. Positioned beneath the drum 11 is a guide bar 46, which allows the beans to slip sufficiently far out of the slots 30 to insure the string end of the bean being cut off as the bean passes the cutter knife, which is in engagement with the periphery of the drum.

The lower cutter knife is pivoted at 47 to a block 48 attached to a cross bar 49 on the frame of the machine. A bracket 50 positioned on the bar carries a compression spring 51 which is positioned between the bracket 50 and the cutter bar so as to hold the latter resiliently against the guide bar 46. The spring 51 and the spring 44 hold the cutting knives resiliently against the bean. This provides a safety means in case some object should drop through the slots which could not be readily cut in two.

A perforated pan 53 positioned beneath the last cutting knife allows the bean ends to drop through and the beans themselves to be delivered to any predetermined place. The pan has a sloping bottom and is oscillated by any suitable mechanism, not shown, to shake the bean ends through the perforations in the bottom.

Positioned on the outer end of the shaft 34 is a gear 54 which meshes with a gear 55 on a vertical shaft 56. The shaft 56 is carried by bearings 57 on the cross bar 39, and 58 on the cross bar 21. The upper end of the shaft 56 carries a gear 60 which meshes with a gear 61 which in turn drives the conveyor mechanism 62. This conveyor mechanism consists of an endless belt, carrying buckets 63, the belt passing at its lower end around an idle pulley 64. The beans may be fed to the conveyor through an opening 68.

The operation of the device is as follows:
Power is delivered to the machine through the pulley 35, and a pinion 34 upon this shaft drives a gear wheel 32, which meshes with a wheel 23 on the upper drum to rotate the drums in unison. The radial passages 13 on the drum 12 and those 30 on the drum 11 are so placed as to be in alignment at all times during the rotation of the two drums. The shaft 34 through the gearing just described drives the shaft 56, which in turn drives the conveyor device 62. Beans therefore may be fed into the hopper 68 and carried by the buckets 63, from which they are delivered into the rotating drum 12. The screw conveyor distributes them longitudinally through the interior of the drum, some of the beans falling through the radial slots, any surplus of beans of course being delivered to the outer end of the drum where they fall out. The beans within the slots 13 as they pass beyond the end of the guide bar 27 come opposite the slots 30 in the lower drum, whereupon they slide down through the latter slots. The ends of the beans drop down into engagement with the bar 36, and as the drum 11 rotates counter-clockwise, the ends of the beans are snipped off by the cutter blade 41. The beans then pass around with their lower end in engagement with the guide bar 36 until they reach the lower half of the drum, whereupon the beans slide back with their other end in engagement with the guide bar 46. The drum rotates to carry the beans down to contact with the cutter bar at the lower part of the drum to cut off the other end of the bean. They then drop out of the slots into the pan 53, where the snipped-off ends drop through the screen and the beans themselves are caused to slide down the inclined bottom to a receptacle, not shown.

It will be obvious to those skilled in the art that various changes may be made in my device without departing from the spirit of the invention, and I, therefore, do not limit myself to what is shown in the drawings and described in the specification, but only as set forth in the appended claims.

Having thus described my said invention, what I claim as new and desire to secure by Letters Patent, is:

1. A bean snipping machine, comprising a feeding drum and a cutting drum the drums being positioned with their peripheries in contact and having radial passages therein, means for rotating the drums, means for delivering beans to the interior of the feeding drum, and means mounted on the other drum for cutting off the ends of the beans substantially as set forth.

2. A bean snipping machine comprising a frame, a drum having radial slots mounted on said frame, a second drum mounted on said frame above said first named drum, and resting against said first named drum, means for driving said drums in timed relation with each other, means for delivering beans to the upper drum, means within said upper drum for distributing beans axially through this drum to cause them to fall into the radial slots in the drum, means within the lower drum for cutting off one end of the beans, and means below the lower drum for cutting off the other end of the beans, substantially as set forth.

3. A bean snipping machine, comprising a frame, a drum having radial slots extending through its periphery mounted on said frame, a second drum having similar radial slots mounted on said frame above and somewhat to one side of said first named drum, and having its periphery in engagement with the periphery of the first named drum, means for driving the drums in timed relation with each other, means for delivering beans to the upper drum, an Archimedean screw within the upper drum for delivering the beans exially through the drum to cause them to drop into the radial slots in the drum, and means on the lower drum for cutting off the ends of the beans, and means for separating the beans from the ends, substantially as set forth.

4. In a bean snipping machine of the kind described a perforated drum, means for delivering beans into said drum, a second perforated drum mounted below but to one side of the first named drum and having its periphery in contact with the periphery of the first named drum, means for driving the drums in timed relation with the perforations of one drum always in coincidence with the perforations of the other, a bracket within the last named drum, a cutter blade on said bracket means resiliently biasing the cutter blade in a direction opposite to the direction of rotation of the drum, a guide bar within said second drum for positioning the beans radially within the drum, a guide bar around the periphery of said second drum adapted to position the beans so as to extend a predetermined radial distance out of said drum and a cutter bar pivotally mounted below said drum and resiliently held against the direction of rotation of the drum, substantially as set forth In witness whereof, I have hereunto set my hand at Elwood, Indiana, this first (1st) day of May, A. D. nineteen hundred and twenty-eight.

ROY F. LAUGHLIN.